United States Patent Office 2,764,600
Patented Sept. 25, 1956

2,764,600

PROCESS FOR THE MANUFACTURE OF HALOGENATED NAPHTHOQUINONE-IMINE

Ernst Merian, Allschwil, Basel-Land, Switzerland, assignor to Sandoz A. G., Basel, Switzerland, a Swiss firm No Drawing. Application August 2, 1954,
Serial No. 447,437

Claims priority, application Switzerland August 7, 1953

1 Claim. (Cl. 260—396)

The present invention relates to a process for the manufacture of halogenated naphthoquinone-imines.

It has been found that halogenated naphthoquinone-imines may be prepared by treating 2,3-dihalogeno-5-nitro-1,4-naphthoquinones which may be substituted in the 6- and/or 7-position by further halogen atoms, with reducing agents, preferably sulfur sesquioxide in a concentrated sulfuric acid medium.

Halogenated naphthoquinone - imines are already known. They dye cellulose acetate fibers in fast blue to violet shades and distinguish themselves by their excellent affinity to polyester fibers of the type of Dacron and Terylene. These naphthoquinone-imines show a good drawing capacity and a good fastness to light when dyed on polyester fibers, and they differ in these respects from the well-known blue and violet dispersed dyes of the anthraquinone series. Of course they also possess a certain affinity to other artificial fibers, e. g. polyamide, polyvinyl and polyacrylonitrile fibers.

Till now these valuable dyestuffs of the naphthoquinone-imine series have been prepared by an uneconomical process using 1,5-dinitronaphthalene as starting material. The nitration of naphthalene gives only a 25 to 33% yield of the 1,5-dinitronaphthalene, and for the main product, that is 1,8-dinitronaphthalene, obtained in a 65% yield, no technical use is known. Thus the yield of halogenated naphthoquinone-imines is small with regard to naphthalene.

Surprisingly it has now been found that 2,3-dihalogeno-5-nitro-1,4-naphthoquinones which may be substituted in the 6- and/or 7-position by further halogen atoms, are transformed into the respective halogenated 5-nitroso-8-hydroxy-1,4-naphthoquinones by the action of sulfuric acid and that the latter compounds can be reduced to the respective halogenated naphthoquinone-imines. Part of the thus obtained dyestuffs are new. Thus the 2,3 - dihalogenonaphthoquinone - imines corresponding to the formula

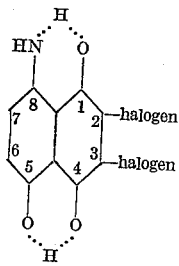

have been prepared for the first time by this new process. The products according to the present invention dye cellulose ester and polyester fibers in violet shades which are fast to washing and to light.

The manufacture of the halogenated 5-nitro-1,4-naphthoquinones, which serve as starting material, from the above mentioned 2,3-dihalogeno-1,4-naphthoquinones is known. In contradistinction to the nitration of naphthalene the nitration of the said compounds takes a uniform course, whereas the 2,3-dihalogeno-1,4-naphthoquinones are cheap commercial products.

In order to prepare the halogenated naphthoquinone-imines, the 2,3-dihalogeno-5-nitro-1,4-naphthoquinones which may be substituted in the 6- and/or 7-position by further halogen atoms, are dissolved in concentrated sulfuric acid, preferably in sulfuric acid monohydrate or fuming sulfuric acid. The higher the concentration of the sulfuric acid the lower the reaction temperature can be chosen. Preferred reducing agents are sulfur compounds which are obtained for example by treating elementary sulfur with fuming sulfuric acid, e. g. sulfur sesquioxide. The reaction starts at moderate temperate and is exothermic. Thus it can be easily be controlled by suitable cooling of the reaction mass. Other reducing agents which are suited for the process according to the present invention are highly dispersed metals, e. g. tin or iron chips. The reaction products are isolated preferably by pouring the reaction mass into ice water and by filtration of the precipitate. The filter cake is washed until it is free from acid and then worked into dye preparations which may be used in paste form or as dry powders.

The following examples illustrate the present invention without limiting it. The proportions of the reactants and the temperatures can be varied within wide limits. The parts represent parts by weight and the temperatures are indicated in degrees centigrade.

*Example 1*

27.2 parts of 2,3-dichloro-5-nitro-1,5-naphthoquinone are slurried in 270 parts of 100% sulfuric acid. After the addition of 5 parts of sulfur powder there are added dropwise 100 parts of fuming sulfuric acid with a $SO_3$-content of about 64%, in the course of 2 hours. The temperature of the mass which reachses 40° C. is maintained at this level by moderate outer cooling. When the fuming sulfuric acid has been added, the mass is stirred at 40° C. for four hours, after which time it is poured into ice water. The precipitated dyestuff is filtered off, washed free from acid and worked into a paste or a powder is the usual manner. The new dyestuff corresponds to the formula

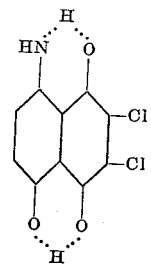

and is a dark powder which dissolves in ethanol with a violet color (absorption maxima at 635 mµ, 585 mµ and 540 mµ and in pure concentrated sulfuric acid with a crimson color. When applied in dispersed form at an elevated temperature it dyes cellulose acetate and polyester fibers in pure violet shades of very good fastness properties. Especially the fastness to light of the dyeing on the polyester fiber is to be qualified as excellent.

*Example 2*

If in Example 1, the 27.2 parts of 2,3-dichloro-5-nitro-1,4-naphthoquinone are replaced by 38.1 parts of 2,3-dibromo-5-nitro-1,4-naphthoquinone, there is obtained a dispersed dyestuff of similar properties. It corresponds to the formula

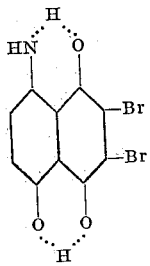

Example 3

30.7 parts of 2,3,6-trichloro-5-nitro-1,4-naphoquinone (obtained by nitration of 2,3,6-trichloro-1,4-naphthoquinone) are slurried in 400 parts of 100% sulfuric acid. The mass is heated to 120° C. and 5 parts of sulfur powder are added in small portions at this temperature. As soon as the intensity of color of samples dissolved in ethanol no longer increases, the red colored mass is poured onto ice water. The precipitated violet dyestuff is filtered off and washed free from acid. It corresponds to the formula

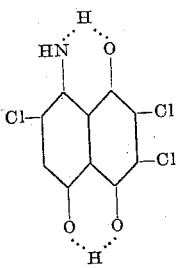

Example 4

If in Example 1, the 27.2 parts of 2,3-dichloro-5-nitro-1,4-naphthoquinone are replaced by 23.9 parts of 2,3-difluoro-5-nitro-1,4-naphthoquinone, there is obtained a dispersed dyestuff of similar properties. It corresponds to the formula

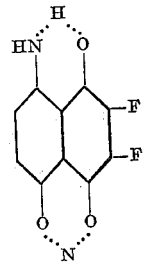

Example 5

The dyestuff according to Example 1 is transformed into a dye preparation by dry milling it togther with the same amount of a dispersing agent and half of the amount of sodium sulfate or by pasting it with one and a half of the amount of a dispersing agent and drying of the paste, for example in an atomizing drier.

4 parts of this dye preparation are dispersed in the usual manner in 2,000 parts of water. 100 parts of Dacron are introduced into the dye bath. The temperature is raised and dyeing continued for one hour at 125° C. After rinsing and soaping, there is obtained a violet dyeing of excellent fastness to washing and to light.

Similar dyeings are obtained if suitable dyeing aids (carries), e. g. benzene carboxylic acid, 1-hydroxy-2-phenylbenzene or trichlorobenzene, are added to the dye bath and the dyeing is carried out at 95° C.

Having thus disclosed the invention, what is claimed is:

A process for the manufacture of 2,3-dichloro-1,4-dihydroxy-5,8-naphthoquinone-imine-(8) which comprises the step of treating 2,3-dichloro-5-nitro-1,4-naphthoquinone with sulfur sesquioxide in concentrated sulfuric acid medium.

References Cited in the file of this patent

UNITED STATES PATENTS

| | | |
|---|---|---|
| 2,538,005 | Kartaschoff | Jan. 16, 1951 |
| 2,553,047 | Kartaschoff | May 15, 1951 |
| 2,623,872 | Kartaschoff | Dec. 30, 1952 |